Nov. 2, 1937.    G. D. ROBINSON    2,097,844
AUTOMATIC CAN FILLER
Filed Feb. 11, 1937
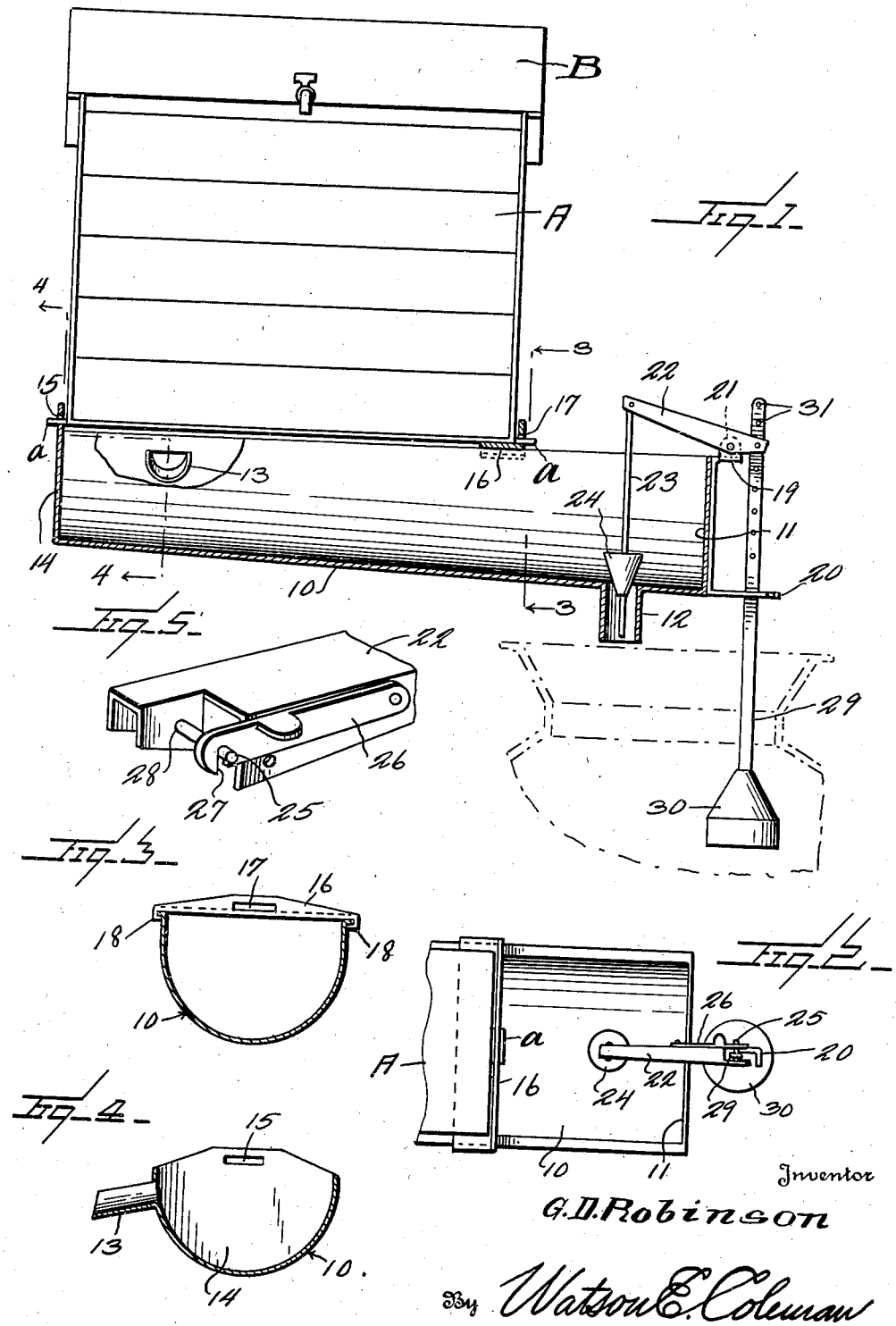

Patented Nov. 2, 1937

2,097,844

UNITED STATES PATENT OFFICE 2,097,844

AUTOMATIC CAN FILLER

Guilford D. Robinson, Eden, N. Y.

Application February 11, 1937, Serial No. 125,335

5 Claims. (Cl. 226—127)

This invention relates to a device adapted to be used in connection with a milk cooler and aerating tank for the purpose of receiving milk or cream therefrom and discharging the milk or cream into milk cans.

The general object of the invention is to provide a device of this character which will permit milk from the cooler to be discharge into one can and then when that can is filled to a certain level, to stop the flow of milk into the first named can and discharge the milk into a second named can, thus preventing any overflow of milk from the first named can.

Another object is the provision of a trough having means whereby it may be readily connected to and disposed beneath a milk cooler to receive milk therefrom, this trough having two outlets, one of the outlets having a valve controlling the flow therethrough, this valve being connected to a float adapted to extend down into the milk can, and when the milk in the can has risen to a predetermined degree, the float will close the valve, thus permitting the milk to flow out from another outlet into a second can, thus doing away with the necessity of someone staying near the cooler and watching for the first can to fill.

A further object is to provide a device of this character in which the float is adjustable vertically so as to suit different heights of cans and also so as to provide for filling the can to a certain predetermined level.

Other objects will appear in the course of the following description.

My invention is illustrated in the accompanying drawing wherein:

Figure 1 is a longitudinal sectional view of a can filling trough constructed in accordance with my invention showing in elevation the milk cooler and the feed tank and in dotted lines a milk can.

Figure 2 is a fragmentary top plan view of the discharge end of the trough.

Figure 3 is a section on the line 3—3 of Figure 1.

Figure 4 is a section on the line 4—4 of Figure 1 and showing the auxiliary discharge spout on the trough.

Figure 5 is a fragmentary perspective view of the float controlled lever showing the latch for the float rod pin.

Referring to this drawing, 10 designates a trough which may be made of metal or any other suitable material, and this trough is deeper at the end 11 than at the other end. The trough is provided at its deepest end with the outlet pipe 12 and adjacent its shallower end the side of the trough is provided with an outlet duct 13. The end 14 of the trough has a slot 15. Slidingly mounted upon the opposed walls of the trough adjacent the lower end is a transverse cross bar 16 having an upwardly extending flange formed with a slot 17. The walls of the trough are slightly flanged and the cross bar 16 at its ends is returned so as to fit under this flange, as at 18. Thus the cross bar may be shifted nearer to or farther from the wall 14. The wall 11 of the trough has an outwardly extending lug 19 at its upper edge and an outwardly extending lug 20 below the lug 19. The lug 20 is slotted. The lug 19 is formed with two upwardly projecting ears 21. Pivotally mounted upon these ears is an arm or lever 22, which at its inner end is pivotally connected to a valve rod 23 extending down through the outlet pipe 12 and carrying a valve 24. This valve closes the outlet 12 when the valve is lowered and opens the outlet 12 when the valve is raised. The opposite end of the arm 22 is cut away at 25 and is provided with a pivoted latch 26 having a vertical slot 27. Extending laterally from this end of the arm is a pin 28 and the slot 27 of the latch is adapted to engage over this pin. Mounted upon a rod 29 is a float 30 preferably tapered upward and this float rod is formed with a plurality of perforations 31 through any one of which the pin 25 may pass. Thus the rod may be adjusted vertically with relation to the pin 26 so as to increase or decrease the effective length of this float rod 29. The rod passes through the slot in the lug 20 and the float 30 is designed to be placed within the milk can, as shown in Figure 1, and when the milk rises within this can to a predetermined point, the float will rise, thus closing the valve 24 and preventing the further flow of milk into the first can. When the discharge of milk is stopped through the spout 12, the milk will accumulate within the trough and will eventually pass out through the spout 13 into a second can.

The slots 15 and 17 are for the purpose of connecting the trough to a milk cooler designated A, into which a feed tank B discharges. This cooler may be of any suitable character but is provided with the laterally projecting lugs $a$ at opposite ends. In attaching the trough 10 to the cooler, one of these lugs $a$ at one end of the cooler is inserted in the slot 15 and then the cross-bar 16 is shifted along the trough until the slot engages over the other lug $a$, then the trough is supported entirely upon the cooler. It will be noted that the rod 23 extends down through the valve and into the spout 12 and thus constitutes a guide for the valve, so that the valve 26 cannot get out of place but will be sure to close when the float 30 rises.

It will be seen that with this device, cans of any size can be filled and any can be filled to a predetermined point by adjusting the float rod 29. The device can be cheaply made, is readily attached to any ordinary cooler and has been found extremely effective in practice, because it provides for an automatic shutting off of the milk discharged into the first can when this can is filled. In filling cans from a milk cooler, there is a constant loss of milk or waste of milk, unless the operator is at hand at all times to watch the filling of the cans. There is always liability, without this device, of a can overflowing.

What is claimed is:—

1. A can filler, including a trough having an outlet spout at one end and a second outlet spout adjacent the other end of the trough, one end of the trough having an end wall formed with a slot, a cross bar mounted upon the trough and shiftable toward or from the end wall and having a corresponding slot whereby the trough may be engaged with lugs on a cooling tank, an arm pivotally supported at one end of the trough, an upwardly opening valve controlling passage through the first named outlet spout and carried by one end of the arm, and a float adjustably mounted upon the other end of the arm exteriorly of the trough.

2. A can filler, including a trough deeper at one end than at the other and having an outlet pipe in the bottom of the trough at its deeper end, there being an outlet spout in the side wall of the trough adjacent the other end of the trough, means constructed and arranged to support the trough below a cooling tank, an arm pivotally supported upon the end wall of the trough at the deepest portion of the trough, an upwardly opening valve controlling passage through the adjacent outlet and having a rod connected to the arm, a pin on the other end of the arm, a float rod carrying a float and having a plurality of perforations with any one of which the pin is adapted to engage, and a latch carried by the arm and movable into position over the end of said pin to prevent the accidental disengagement of the float rod with the pin.

3. A can filler, including a receptacle having an outlet spout, one end of the receptacle having an end wall formed with a slot, a cross-bar mounted upon the receptacle and shiftable toward or from the end wall and having a corresponding slot whereby the receptacle may be engaged with lugs on a cooling tank, an arm pivotally supported at one end of the receptacle, an upwardly opening valve controlling passage through the outlet spout and carried by one end of the arm, and a float mounted upon the other end of the arm and exteriorly of said receptacle.

4. A can filler, including a trough deeper at one end than at the other and having an outlet opening at the deep end, the trough having end walls at its opposite ends, a cross-bar mounted upon the trough and shiftable toward or from the wall at the shallow end of the trough, said last named wall and the cross-bar having means for engagement with a cooling tank constructed and arranged to support the trough from the cooling tank, an arm pivotally supported at the deep end of the trough, an upwardly opening valve controlling passage through the outlet and carried on one end of the arm, and a float mounted upon the other end of the arm exteriorly of the trough.

5. A can filler, including a receptacle having an outlet in its bottom, an arm pivotally supported upon the trough, an upwardly opening valve controlling passage through the outlet and having a rod connected with the arm, a pin on the other end of the arm, a float rod carrying a float and having a plurality of perforations with anyone of which the pin is adapted to engage, and a latch carried by the arm and movable into position over the end of said pin to prevent any accidental disengagement of the float rod from the pin.

GUILFORD D. ROBINSON.